United States Patent [19]
Makino

[11] Patent Number: 5,001,641
[45] Date of Patent: Mar. 19, 1991

[54] MULTIPLE CONTROL CIRCUIT

[75] Inventor: Fumio Makino, Osaka, Japan

[73] Assignee: Sumitomo Electric Industries, Ltd., Osaka, Japan

[21] Appl. No.: 540,869

[22] Filed: Jun. 19, 1990

Foreign Application Priority Data

[30] Mar. 20, 1987 [JP] Japan ............ 62-66808

Related U.S. Application Data

[63] Continuation of Ser. No. 171,472, Mar. 21, 1988, abandoned.

[51] Int. Cl.⁵ .......... G06F 15/20; B60T 8/86
[52] U.S. Cl. .............. 364/426.02; 180/197; 303/95
[58] Field of Search ......... 74/68; 364/426.01, 426.02, 364/426.03; 303/20, 92, 93, 95; 371/68; 180/197

[56] References Cited

U.S. PATENT DOCUMENTS

| | | | |
|---|---|---|---|
| 4,251,873 | 2/1981 | Joby | 371/68 |
| 4,360,918 | 11/1982 | Ruhnav et al. | 303/92 |
| 4,400,792 | 8/1983 | Strelow | 371/68 |
| 4,493,210 | 1/1985 | Fries et al. | 303/92 |
| 4,497,059 | 1/1985 | Smith | 371/68 |
| 4,520,482 | 5/1985 | Fourré et al. | 371/68 |
| 4,546,437 | 10/1985 | Bleckmann et al. | 364/426.01 |
| 4,644,538 | 2/1987 | Cooper et al. | 371/68 |
| 4,745,542 | 5/1988 | Baba et al. | 364/426.02 |
| 4,773,072 | 9/1988 | Fennel | 303/92 |
| 4,805,103 | 2/1989 | Matsuda | 364/426.02 |
| 4,841,446 | 6/1989 | Leiber et al. | 364/426.01 |
| 4,848,850 | 7/1989 | Yoshino | 364/426.02 |

Primary Examiner—Thomas G. Black
Attorney, Agent, or Firm—Wenderoth, Lind & Ponack

[57] ABSTRACT

An improved multiple control circuit is for use with an anti-lock brake control assembly. It includes a plurality of control logic circuits and an output decision circuit. The control circuits simultaneously receive redundant sensor signals representative of wheel speeds and carry out logical operations based upon the input signals to simultaneously transmit redundant command signals to control the brake pressure of the wheels. Such output signals are not directly sent to actuators, such as brake pressure control valves, but are instead sent through the output decision circuit. If the command signals of the control circuits should be different for some reason, the output decision circuit selects and transmits to the actuators the command signals to control the automobile in the safest manner based upon AND logic and OR logic. Each control circuit is connected to a comparator which compares the output signals of the control circuit with those of the output decision circuit. If there is a discrepancy between the signals and if such a discrepancy persists for a predetermined period of time, a fail-safe signal is produced to disable the anti-lock brake control system.

9 Claims, 3 Drawing Sheets

MULTIPLE CONTROL CIRCUIT

This application is a continuation of now abandoned application, Ser. No. 07/171,472 filed on Mar. 21, 1988 now abandoned.

The present invention relates to a multiple control circuit for use with an electronic control device for an automobile, and, more specifically an anti-lock brake control assembly used to control automobile brakes.

Modern automobiles are equipped with various types of electronic control devices to control their running conditions. Among them, an anti-lock brake control device used to control an automotive brake is expected to work in an extremely reliable manner in view of the fact that the failure of the braking device directly leads to endangerment of the passenger's lives.

Various types of anti-lock brake control devices are now available. They basically operate as follows: A plurality of sensors provided at the front and rear wheels detect rotational speeds of the wheels. The signals from the sensors are converted into pulse signals. A central processing unit (CPU) computes wheel speeds, reference wheel speeds (estimated vehicle speed) and accelerations on basis of the input signals. If a driver abruptly applies the brake when the car is running on a slippery road surface, the wheels tend to lock. In an ordinary anti-lock system, the CPU detects such an abnormal state of the wheels by comparing the wheel speeds with the reference wheel speeds and provides signals to brake pressure control, valves so as to release the brakes only momentarily and to then apply the brakes again when the wheels recover to predetermined rotational speeds. In other words, the valves are controlled so that the coefficient of friction between the wheels and the road surface will be maintained at its maximum.

Such anti-lock brake control involves releasing brakes even while the driver is applying brakes. If any of the anti-lock control systems should become out of order or malfunction, a serious accident will result. Thus, it has been proposed to provide the anti-lock control system with a means for detecting the malfunction and disabling the anti-lock control system return the automobile to its ordinary braking system.

One example of such anti-lock brake control systems is disclosed in U.S. Pat. No. 4,546,437, which will be described with reference to FIG. 3.

In this system, signals from four sensors which represent the respective wheel speeds are processed at a pulse processing unit and fed in parallel to two independent microcomputers (0) and (1) which operate synchronously with each other. The information stored in the microcomputers (0) and (1) is exchanged therebetween. One of the microcomputers is adapted to control a valve actuating circuit to open and close brake pressure control valves. At the same time, the output signals from the valve actuating circuit are fed to the other microcomputer for monitoring after having been level-converted. The outputs of the latter microcomputer are in turn fed to the former microcomputer. Thus, both microcomputers monitor and supervise the output signals of their counterparts.

Another brake control device shown in FIG. 4 is also known in which the sensor signals for all the wheels are fed to a microcomputer (0) to control brake pressure control valves for the front wheels. The same sensor signals for all the wheels are fed to another microcomputer (1) to control brake pressure control valves for the rear wheels. These two independent microcomputers mutually monitor the output signals of their counterparts to detect any abnormality of the signals.

In another conventional type of brake control device, three microcomputers are provided to control a respective brake pressure control valves, one pair assigned to the front right wheel, another pair to front left wheel and a third pair to both rear wheels. Their output signals are under mutual surveillance.

With the first-mentioned anti-lock brake control device disclosed in U.S. Pat. No. 4,546,437, if multiple malfunctions should take place simultaneously in the control circuit e.g. if the microcomputer for controlling the solenoid valves for brake pressure control should go wrong and the other microcomputer for monitoring the former one should fail to detect its abnormality, abnormal valve control signals might be sent. In view of this and other conceivable failure modes, this device is not necessarily satisfactory in preventing the failures and malfunctions of the circuit.

With the second prior art control device, there is a possibility that at least two lines at one side may suffer the same problem as described above with the first-mentioned prior art.

With the third prior art control device, since the three lines are controlled independently, the failure rate inevitably increases and the production cost is high.

In any of the abovesaid prior art devices, the output signals of the microcomputers are directly fed to the valve actuating circuits. The output signals of one microcomputer are kept under surveillance by the other microcomputer, or two microcomputers operate independently of each other. None of the prior art brake control devices are adapted to cope with multiple malfunctions in such a way as to control the vehicle toward the safer side according to the output signals.

It is an object of the present invention to provide a multiple control circuit which obviates the abovesaid shortcomings.

In accordance with the present invention, there is provided a multiple control circuit comprising: at least two input processing circuits provided independently of each other for processing a plurality of input signals; at least two control logic circuits provided in parallel to each other so as to operate independently and synchronously for receiving the output signals from the respective input processing circuits to perform logic operations according to a predetermined program to give control signals; an output decision logic circuit for receiving the signals from the control logic circuits to perform logic operations according to AND logic, OR logic, or combination of AND and OR logics to decide the outputs; at least two comparator circuits for comparing the outputs of the output decision circuit with the outputs of the control logic circuits to give a discrepancy signal if they differ from each other; and a failsafe output circuit for giving a failsafe output signal upon receipt of the discrepancy signal from one of the comparator circuits, whereby disabling a system is controlled.

Input signals, from sensors are converted into digital signals by an A/D converter circuit. The digital signals fed in parallel to two or more input processing circuits for input processing and then sent to the respective control logic circuits. Upon receiving the input signals, each control logic circuit executes logic operations in accordance with a program stored therein to output control signals for controlling the valve actuating circuits.

The control signals from the two or more control logic circuits should be identical to one another if they operate normally. But practically, the control signals which flash momentarily cannot always be identical to one another due to malfunction or failure of either of the control logic circuits, noise or time lag. If such signals are fed unchecked, the actuating circuits might malfunction.

According to the present invention, the output signals of the control logic circuits are fed to the output decision logic circuits where logic operations are carried out by an AND logic element, an OR logic element or the combination of AND and OR logic elements. If the signals of all the control logic circuits are the same as one another, the output decision circuits output the signals as they are. If not, their output signals coincide with the output signals of some of the control circuits. The output signals of the other control circuits does not coincide with the outputs of the output decision circuits. If this discrepancy signal persists for a predetermined period of time, a failsafe signal occurs, disabling the controlled system. More specifically, if the output signals of any of the control circuits should differ from the other outputs, the comparator circuits will pick up this difference, causing the failsafe output circuit to send out a failsafe signal. With this failsafe signal, the actuating mechanism for the controlled system is partially or completely turned off, thus disabling the entire system being controlled. Thus, the controlled system is assured of its utmost safety and optimum operation by multiple control circuits of the present invention.

Other features and objects of the present invention will become apparent from the following description taken with reference to the accompanying drawings, in which.

Figure 1:
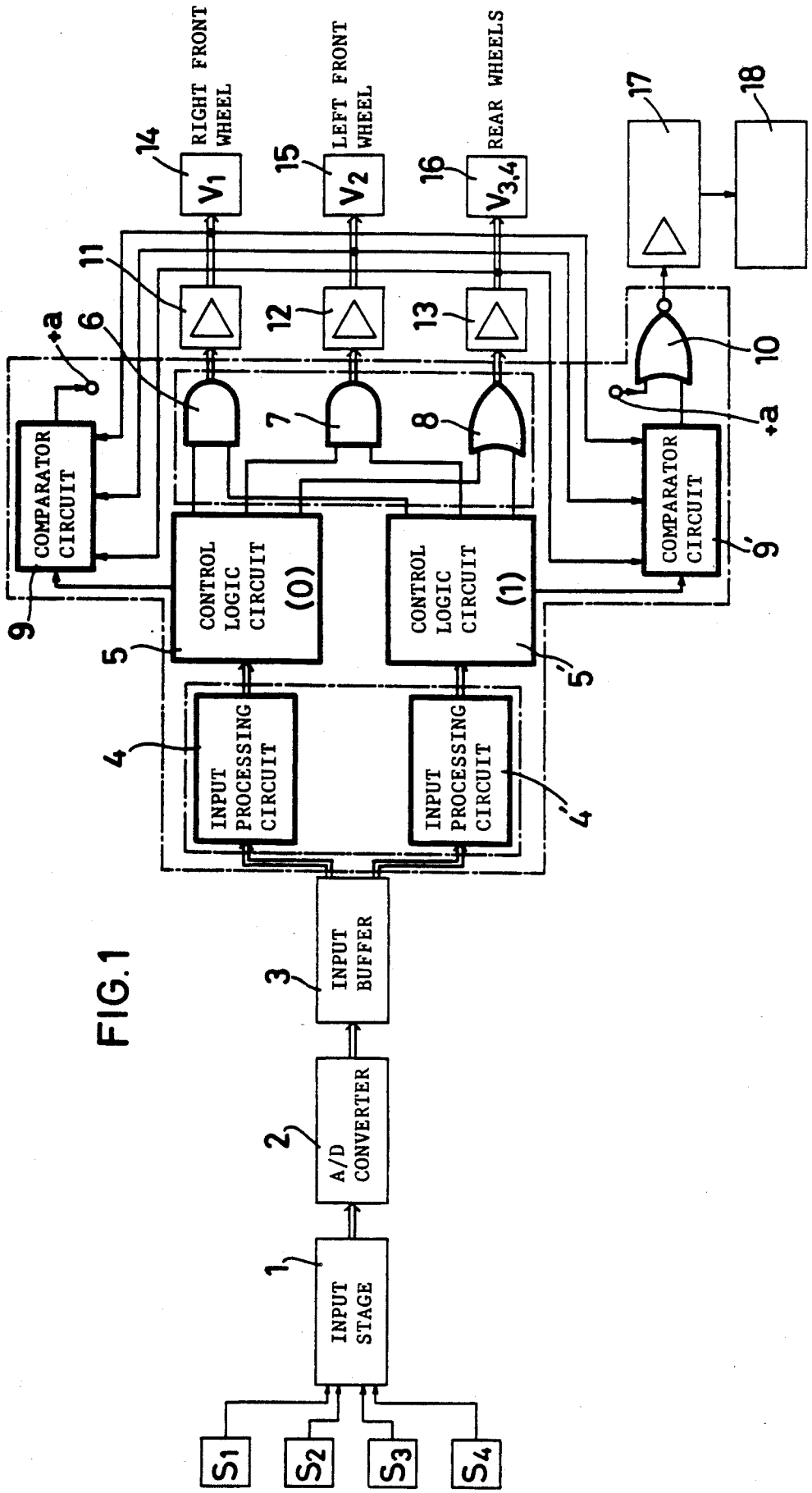
FIG. 1 is a block diagram of the multiple control circuit embodying the present invention adapted for use with an anti-lock brake control assembly.

Referring now to the drawings, FIG. 1 shows an embodiment of the multiple control circuit according to the present invention applied to an anti-lock brake control circuit for a motor vehicle. The elements of the multiple control circuit are delineated by heavy lines, and the other parts of the anti-lock brake control circuit such as an input unit, A/D converter and valve actuating circuits are indicated by fine lines. Sensors $S_1$ to $S_4$ are provided to detect the rotational speeds of wheels and output the information on the wheel speeds as analog signals. The analog signals are sent through an input stage 1 to a digitizer such as an A/D converter 2 where they are converted into pulse signals. The pulse signals are stored temporarily in an input buffer 3 and fed in a parallel relation with one another to a plurality of (two in the preferred embodiment) control systems of the multi-line control circuit.

The multiple control circuit comprises two independent input processing circuits 4, 4' for computing and processing the pulse number and spacings of the pulse signals and two control logic circuits 5 and 5' for carrying out logic operations on the output signals from the respective input processing circuits according to a predetermined program to control signals. The control logic circuits 5 and 5' are provided in parallel and operated independently, but synchronously, with each other.

The control signals from the control logic circuits 5 and 5' function to close and open solenoid valves for controlling the brake pressure in an anti-lock brake assembly which will be described later. The logic circuits 5 and 5' may be microcontrollers or one-chip microcomputers adapted to be operated according to the same one program.

Its logic operation comprises e.g. the steps of calculating from the input signals the ever-changing wheel speeds, determining a reference wheel speed by use of a formula for estimating vehicle speeds from the wheel speeds, and outputting control signals for shifting the mode of the solenoid valve from pressure increase to pressure reduction or pressure holding if the wheel speed becomes lower than the reference wheel speed.

Whether pressure should be reduced or held depends upon the difference between the wheel speed and the reference wheel speed. Lower wheel speed than the reference wheel speed indicates that the slip ratio of the wheels is too high and that the frictional forces by the tires are not effectively utilized to brake the automobile. In that case, braking forces are reduced momentarily. As the slip ratio begins to reduce, the pressure control mode is returned to a pressure increase or pressure holding position. The wheels are thus prevented from locking.

The multi-line control circuit has an output decision logic circuit comprising two AND logic circuits 6 and 7 and an OR logic circuit 8. These circuits give control signals to three solenoid valves 14, 15 and 16 through three valve control circuits 11, 12 and 13 to close and open the solenoid valves. The solenoid valves 14, 15 and 16 are used for the front right wheel, front left wheel and both rear wheels, respectively.

Figure 2:
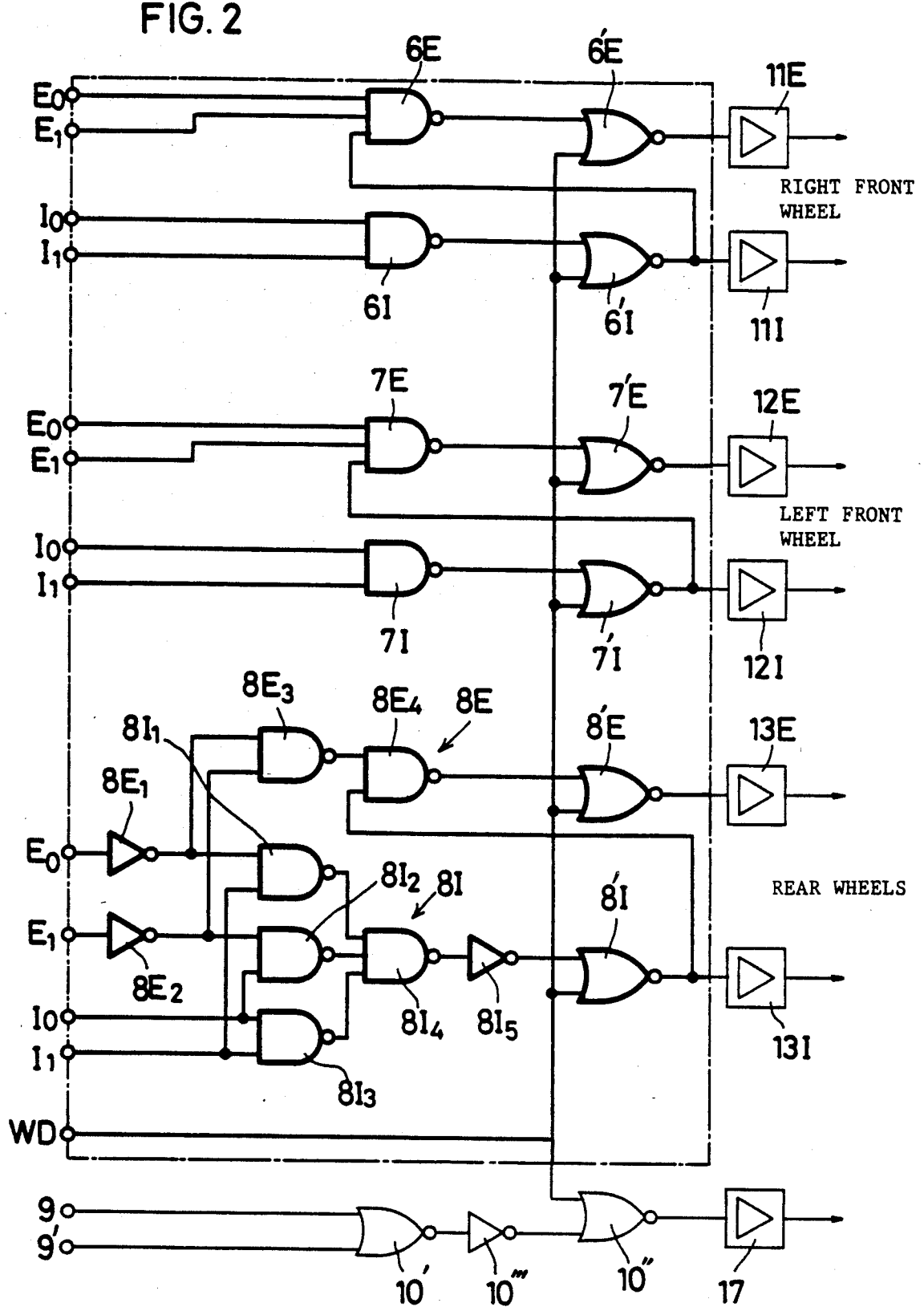
FIG. 2 is a block diagram of the output decision logic circuits of the same.
Figure 3:
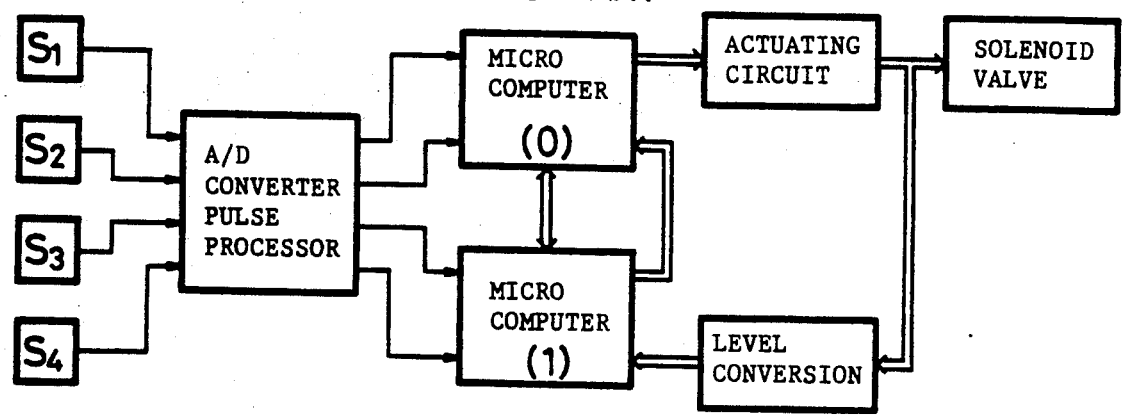
FIGS. 3 and 4 are block diagrams of conventional anti-lock brake control circuits.
Figure 4:
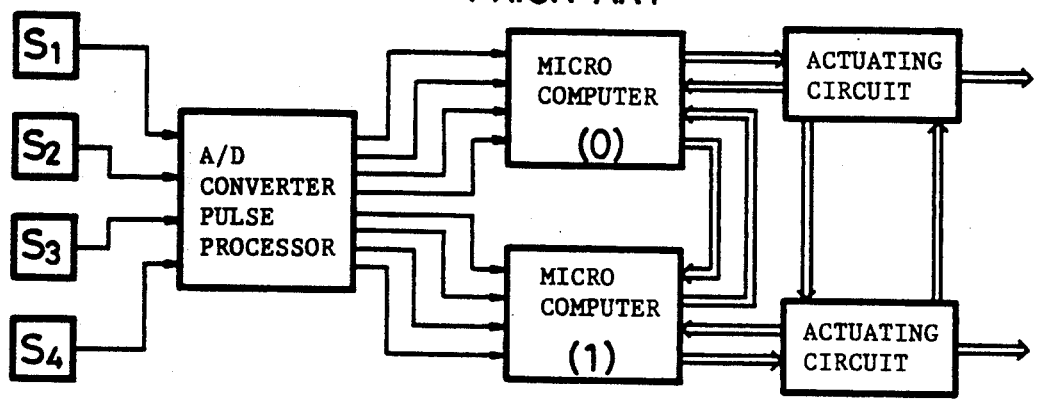

FIG. 2 shows the details of the output decision logic circuit which is enclosed in dashed line. Other related parts are shown by fine lines. Each solenoid valve comprises an intake valve and an exhaust valve. Thus six valves are used for the front right wheel, front left wheel and both rear wheels. In FIG. 2, reference characters I and E are attached to numerals to distinguish the intake valve lines from the exhaust valve lines. The output decision logic circuits for the front right wheel and for the front left wheel function as AND logic circuits which satisfy the following formulas:

$$I = I_0 \cdot I_1$$

$$E = I_0 \cdot E_0 \cdot I_1 \cdot E_1 = I \cdot (E_0 \cdot E_1)$$

(wherein I and E are outputs from the lines, and $I_0$, $I_1$, $E_0$, $E_1$ are outputs from the control logic circuits 5 and 5' in which $I_0$ and $E_0$ are from circuit 5 and $I_1$ and $E_1$ are from circuit 5').

The output decision circuit for the rear wheels functions as an OR logic circuit which satisfies the following formulas:

$$I = I_0 \cdot I_1 + I_0 \cdot E_1 + I_1 \cdot E_0$$

$$E = (I_1 \cdot E_1 + I_0 \cdot E_0) \cdot I$$

If one or both of the control logic circuits (one-chip microcomputers) should get out of control, watch dog signals WD are inputted to NOR elements $6'_E$, $6'_I$, $7'_E$, $7'_I$, $8'_E$, $8'_I$ to forcibly turn off all the outputs of the output decision circuits. In other words, no outputs are sent out as long as the WD signals are high level signals (hereinafter referred to as H). Normally, the watch dog signals are low level signals (hereinafter referred to as L). Thus, if the other input of each line is L, the output is H and if the input is H, the output is L. Since the logic elements located upstream of the NOR elements $6'_E$, $6'_I$, $7'_E$, $7'_I$ are NAND elements $6_E$, $6_I$, $7_E$, $7_I$, the output decision logic circuits for the front wheels constitute AND logic circuits as a whole, and the one for the rear wheels constitute an OR circuit since the logic elements located upsteam of the NOR elements $8'_E$ and $8'_I$ are NOR elements $8_E$, $8_I$.

With reference to the intake valve line for the front right wheel, for example, if both input signals are H, the output of the NAND element $6_I$ is L. Normally the other input signal of the NOR element $6'_I$ is L. Thus, its output is H. If both input signals are L, the output of the NAND element $6_I$ is H and the output of the NOR element $6'_I$ is L. Thus, this circuit is an AND logic circuit as a whole. The same is true of the intake valve line for the front left wheel ($7_I$, $7'_I$, $12_I$).

The exhaust valve lines for both front wheels ($6_E$, $6'_E$, $11_E$ and $7_E$, $7'_E$, $12_E$) are basically of the same structures as the intake valve lines except that the outputs I of the intake valve lines are inputted to the NAND elements $6_E$, $7_E$ as input signals.

The intake valve line for the rear wheels ($8_I$, $8'_I$, $13_I$) constitutes an OR logic circuit comprising NAND elements $8_{I1}$, $8_{I2}$, $8_{I3}$, $8_{I4}$, an inverter $8_{I5}$ and a NOR element $8'_I$. Its exhaust valve line ($8_E$, $8'_E$, $13_E$) also constitutes an OR circuit comprising inverters $8_{E1}$, $8_{E2}$ and NAND elements $8_{E3}$, $8_{E4}$.

The multiple control circuit including the output decision logic circuits further comprises comparator circuits 9 and 9' and a failsafe output circuit 10 as shown in FIG. 1. The outputs of the output decision logic circuits are supplied to the actuating circuits 11, 12 and 13 for the solenoid valves 14, 15 and 16 and amplified by the actuating circuits to obtain the valve actuating signals. The comparator circuits compare the valve actuating signals with the output signals of the control logic circuits 5 and 5'.

The failsafe output circuit 10 sends out a failsafe output signal upon receiving from either of the comparator circuits a signal indicating the discrepancy between the signals compared. The failsafe output signal is given to an actuating circuit 17 of a failsafe relay 18 for turning on and off the power to the solenoid valves 14, 15 and 16 to switch off the failsafe relay and partially or completely disabled the anti-lock brake control unit. As shown at lower part of FIG. 2, the failsafe output circuit 10 comprises NOR elements 10' and 10" and an inverter 10''' interposed therebetween. The watch dog signal fed to the output decision logic circuits is given to the circuit 10 as well.

The failsafe output circuit 10 is a negative logic circuit. Thus, if either of the output signals of the comparator circuits 9, 9' is a discrepancy signal (H), the output signal of the NOR element 10' will be L, the output signal of the inverter 10''' will be H, and hence one of the input signals of the NOR element 10'' will be H. Since the WD signal is normally L, the output signal of the NOR element 10'' will be L. This low level signal turns off the actuating circuit 17, thus turning off the failsafe relay 18. The anti-lock brake control assembly is thus partially or completely disabled. This means that the output signals of the comparator circuits 9 and 9' function as failsafe signals. In order to allow the actuator for the anti-lock brake control assembly to operate normally, the failsafe relay has to be turned on. This condition is established only if both the WD signal and the output signal of the inverter 10''' are L. Thus the output signals of the comparator circuits 9 and 9' have to be L as well.

The logic structure of the output decision circuits will now be described. A pair of intake and exhaust solenoid valves are used in the respective lines for the front right wheel, front left wheel and both rear wheels. Brake pressures are controlled in one among three positions i.e. pressure increase, pressure holding and pressure reduction by changing the combination of control input signals for these valves.

TABLE 1

| Intake valve (I) | Exhaust valve (E) | Brake pressure |
| --- | --- | --- |
| OFF (L) | OFF (L) | Pressure increase (normal state) |
| ON (H) | OFF (L) | Pressure holding |
| ON (H) | ON (H) | Pressure reduction |
| OFF (L) | ON (H) | (Inhibition output) (non-use) |

The outputs of the control circuits 5, 5' ($CPU_0$ and $CPU_1$) are simultaneously fed to the output decision logic circuits. Table 2 shows the relationship between the output signals of both the CPUs and those of the output decision logic circuits which are the results of logic operations of the outputs of the CPUs.

TABLE 2

| | $CPU_0$ | | | |
| --- | --- | --- | --- | --- |
| $CPU_1$ | Pressure increase (I,E) = (L,L) | Pressure holding (I,E) = (H,L) | Pressure reduction (I,E = (H,H) | Inhibition output (I,E) = (L,H) |
| For right front and left front wheels . . . AND logic | | | | |
| Pressure increase | Increase | Increase | Increase | Increase |
| (I,E) = (L,L) | (L,L) | (L,L) | (L,L) | (L,L) |
| Pressure holding | Increase | Holding | Holding | Increase |
| (I,E) = (H,L) | (L,L) | (H,L) | (H,L) | (L,L) |
| Pressure reduction | Increase | Holding | Reduction | Increase |
| (I,E) = (H,H) | (L,L) | (H,L) | (H,H) | (L,L) |
| Inhibition output | Increase | Increase | Increase | Increase |
| (I,E) = (L,H) | (L,L) | (L,L) | (L,L) | (L,L) |
| For both rear wheels . . . OR logic | | | | |
| Pressure | Increase | Holding | Reduction | Increase |

TABLE 2-continued

| CPU1 | CPU0 | | | |
|---|---|---|---|---|
| | Pressure increase (I,E) = (L,L) | Pressure holding (I,E) = (H,L) | Pressure reduction (I,E = (H,H) | Inhibition output (I,E) = (L,H) |
| increase (I,E) = (L,L) | (L,L) Holding | (H,L) Holding | (H,H) Reduction | (L,L) Increase |
| Pressure holding (I,E) = (H,L) | (H,L) Reduction | (H,L) Reduction | (H,H) Reduction | (L,L) Increase |
| Pressure reduction (I,E) = (H,H) | (H,H) Increase | (H,H) Increase | (H,H) Increase | (L,L) Increase |
| Inhibition output (I,E) = (L,H) | (L,L) | (L,L) | (L,L) | (L,L) |

In Table 2, if the output signals of the $CPU_0$ and $CPU_1$ are different from each other e.g. if the output signals of the $CPU_0$ are for pressure holding and those of the $CPU_1$ are for pressure reduction, the output decision logic circuits will output pressure holding signals which are different from the output signals of the $CPU_1$. In such a case, the comparator circuit 9' produces a discrepancy signal (H) and thus the failsafe output circuit 10 produces a failsafe output signal. However, if the duration of presence of different output signals of the CPUs is too short, the failsafe signal will not be produced. Whether or not to produce a failsafe signal is decided by the CPUs according to the duration of different signals.

In the preferred embodiment, a duration of 8 milliseconds (ms) is the borderline. If different signals should last longer than 8 ms, the failsafe signal will be produced while maintaining the operation as shown in Table 2. If the discrepancy of signals is corrected within 8 ms, the failsafe output signal will not be produced and brake control will be executed according to Table 2. If the failsafe signal is produced, the failsafe relay 18 will be turned off to partially or completely cut off the electrical circuit from the hydraulic actuators of the anti-lock brake control assembly, thus disabling the entire control assembly.

From Table 2, it will be understood that if the outputs of the $CPU_0$ and $CPU_1$ are different from each other, the output decision logic circuit selects and outputs the signals on the pressure increase side for the front wheels according to AND logic, and the signals on the pressure reduction side for the rear wheels according to OR logic. With this arrangement, if the output signals of the two CPUs, which must be identical, should be different from each other because of the malfunction of one or both of the CPUs, noises or time lags between the output signals from the CPUs, the front wheels are controlled by the signals on the pressure increase side so as to be braked with a greater brake pressure. On the other hand, the rear wheels are controlled by the signals on the pressure reduction side so as to be braked with a smaller brake pressure to maintain the stability of the vehicle.

The front wheels and the rear wheels are controlled in opposite ways to each other if the two CPUs should produce different outputs. This is because the braking force on the front wheels accounts for 70–80 per cent of the entire braking force (on both front and rear wheels) owing to the load distribution factor of the vehicle during braking. It is known from experience that the front wheels should be controlled toward the pressure increase side to insure braking force and the rear wheels should be controlled toward the pressure reduction side for greater drivability and stability of the vehicle and to prevent tail swinging.

In the preferred embodiment, we employed a three-position pressure control including pressure increase, pressure holding and pressure reduction. It will be readily understood that two-position control including pressure increase and pressure reduction is also applicable.

With the prior art anti-lock brake control device, input signals from sensors are fed in parallel to two independent central processing units. The outputs of one of the CPUs are compared with those of the other. If the outputs of two CPUs are different from each other, it is judged that there is a malfunction, noise or time lag in one of the CPUs. Consequently, the anti-lock brake control assembly is disabled by stopping the transmission of the control signals. Otherwise, such abnormal control signals are given unchecked. In contrast, the multiple control circuit of the present invention is designed to control the system to be controlled always to the safe side according to the characteristics of its operation. This is accomplished by the provision of an output decision circuit which collects the outputs from at least two control logic circuits and decides which to output.

It will be needless to say that the multiple control circuit of the present invention is applicable to other electronic control devices such as a traction controller rather than the anti-lock control assembly.

What is claimed is:

1. A control apparatus for controlling a plurality of slip control devices of an automobile, said control apparatus comprising:

a plurality of non-redundant sensor means for outputting sensor signals;

redundant control logic circuits for receiving the sensor signals from each of said sensor means as redundant signals, processing said redundant signals, and outputting a plurality of sets of redundant control signals for controlling the plurality of slip control devices;

an output decision logic circuit having a plurality of logic means selected from a group comprising AND logic means, OR logic means and a combination of AND and OR logic means, each of said logic means having as inputs a different set of the plurality of redundant control signals, and each for outputting a non-redundant control signal for independently controlling one of the plurality of slip control devices;

a plurality of comparator means for comparing said non-redundant control signals outputted by each of said plurality of logic means with signals outputted by each of said plurality of control logic circuits and for outputting a discrepancy signal if the thus compared signals are different from each other and if this state continues in excess of a predetermined period of time;

a disablement means for disabling at least one of said slip control devices in response to said discrepancy signal being outputted by at least one of said plurality of comparator means.

2. A control apparatus as claimed in claim 1, wherein said plurality of logic means are selected from a group comprising OR logic means and a combination of AND and OR logic means.

3. A control apparatus as claimed in claim 2, wherein said plurality of logic means are OR logic means.

4. A control apparatus as claimed in claim 2, wherein said plurality of logic means are a combination of AND and OR logic means.

5. A control apparatus as claimed in claim 1, further comprising redundant input processing circuits provided between said plurality of sensor means and said respective redundant control logic circuits for processing said redundant signals from said each sensor means before transmitting them to said respective control logic circuits.

6. A control apparatus as claimed in claim 5, wherein said input processing circuits are pulse processing circuits for processing pulse signals.

7. A control apparatus as claimed in claim 1, wherein said control logic circuits are micro-controllers.

8. A control apparatus as claimed in claim 1, wherein said control logic circuits are one-chip microcomputers.

9. A control apparatus as claimed in claim 1, wherein two of said plurality of logic means include an AND logic element and respectively output first and second non-redundant brake pressure control signals for respectively controlling a brake pressure of a right front wheel and a left front wheel of the automobile, and wherein one of said plurality of logic means includes an OR logic element and outputs a third non-redundant brake pressure control signal for controlling a brake pressure of rear wheels of the automobile, and wherein said two of said plurality of logic means is adapted to increase the brake pressure of said right front wheel and the left front wheel when said redundant control signals inputted thereto are different, and wherein said one of said plurality of logic means is adapted to decrease the brake pressure of said rear wheels when said redundant control signals inputted thereto are different.

* * * * *